United States Patent
Ensinger

[15] 3,700,290
[45] Oct. 24, 1972

[54] FLEXURE HINGE ASSEMBLY
[72] Inventor: Willis B. Ensinger, Silver Spring, Md.
[73] Assignee: The Singer Company, New York, N.Y.
[22] Filed: April 5, 1971
[21] Appl. No.: 131,014

[52] U.S. Cl. .................................308/2 A, 74/5 F
[51] Int. Cl. ........................G01c 19/22, F16c 29/00
[58] Field of Search ..........308/2 A; 74/5 F; 248/358; 287/85

[56] References Cited

UNITED STATES PATENTS

| | | |
|---|---|---|
| 2,937,053 | 5/1960 | Rigney........................308/2 A |
| 3,575,475 | 4/1971 | Boerner........................74/5 F |
| 2,960,302 | 11/1960 | Brown..........................74/5 F |
| 3,585,866 | 6/1971 | Ensinger......................74/5 F |

Primary Examiner—Manuel A. Antonakas
Attorney—S. A. Giarratana and Thomas W. Kennedy

[57] ABSTRACT

A flexure hinge assembly consisting of a pair of fixed telescoped tubular members, each having two pairs of slots extending through the walls thereof, the slots of one pair being axially spaced from the slots of the other pair to form a first and second gimbal portion adapted for connection relative to a drive member and a driven member, respectively, and a third gimbal portion extending between the first and second gimbal portions. Holes are formed at the ends of each slot, with the holes of one slot of each pair terminating a predetermined circumferential distance from the corresponding holes of the other slot of the same pair to form flexure portions between the holes which provide effective connections between the gimbal portions while permitting movement of each of the first and second gimbal portions relative to the third gimbal portion about predetermined coordinate axes. A stop member is connected relative to two of the gimbal portions to limit the relative angular deflection between the gimbal portions.

3 Claims, 7 Drawing Figures

Patented Oct. 24, 1972

INVENTOR
WILLIS B. ENSINGER

BY
Thomas W. Kennedy
ATTORNEYS

Patented Oct. 24, 1972

INVENTOR
WILLIS B. ENSINGER

BY
Thomas W. Kennedy
ATTORNEYS

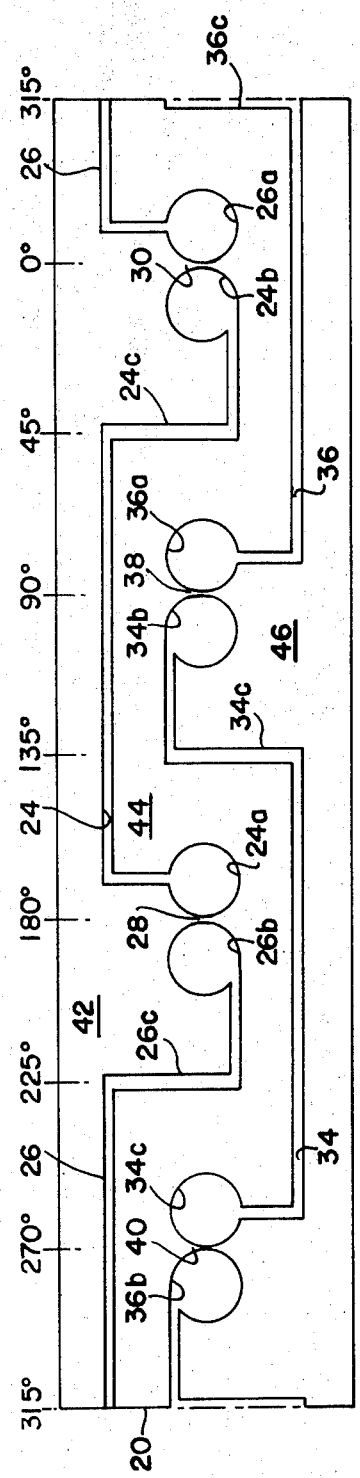
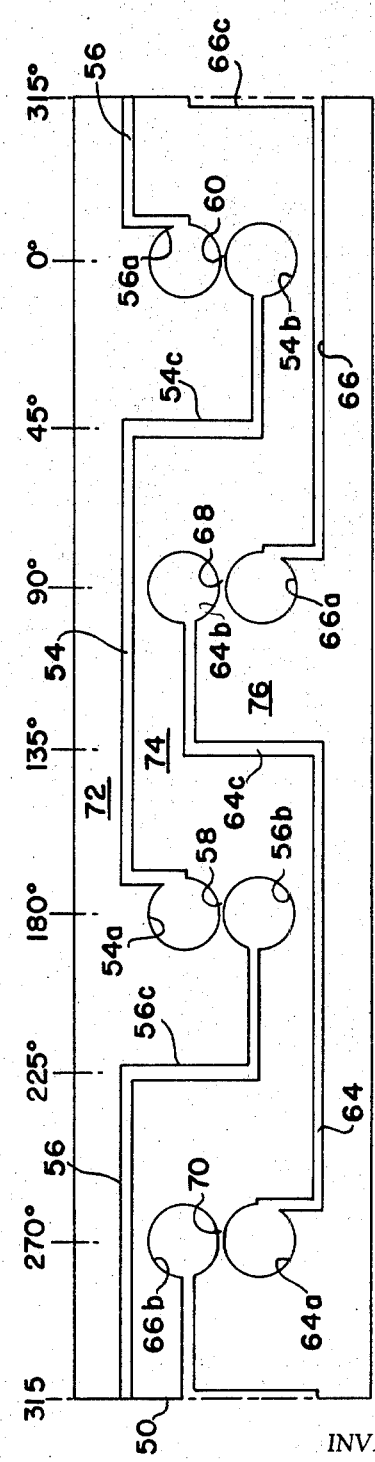

Patented Oct. 24, 1972

INVENTOR
WILLIS B. ENSINGER

BY
ATTORNEYS

FLEXURE HINGE ASSEMBLY

BACKGROUND OF THE INVENTION

This invention relates to a flexure hinge assembly, and, more particularly, to such an assembly for connecting two rotary members while permitting universal movement between them.

Several proposals have been made for a flexure joint extending between a driven member, such as a flywheel, or the like, and its drive shaft, so that the former may be rotationally torqued by the latter, and yet have very low spring restraints for a predetermined range of angular deflections between the two members. For example, in U.S. Pat. No. 3,354,726, by W. J. Kripick and R. F. Cimera, and assigned to the assignee of the present invention, an inner hinge unit is concentrically disposed within an outer hinge unit, with the assembly thus formed having two pairs of oppositely disposed flexure bars which permit universal tilting between the upper portion and the lower portion of the assembly. One of the hinge units has its flexure bars oriented in a manner to contribute high axial strength along the spin axis of the flywheel, and the other unit has its flexure bars positioned so as to provide the necessary radial and torsional stiffness. However, during manufacture of the assembly, the thin flexure sections in each unit are formed by machining four equally spaced pairs of separated "blind" holes in the outside walls of a hollow cylindrical work piece. The work piece is divided into three gimbal portions while making appropriately shaped slots in the wall of the assembly thus formed, thus freeing each gimbal for angular displacement about its respective flexure axis. However, this cutting of the blind holes is extremely difficult, especially due to the fact that the delicate thin flexure sections in each hinge unit are easily ruptured, or overstressed, during assembly, since no limit stops are provided to restrict the angular displacement of the respective gimbals. Therefore, due to the machining of these blind holes, it is necessary to position the inner and outer hinge units by resorting to the use of external reference surfaces. As a result, slight misalignment in the flexure axes of the two hinge units frequently occurs in production, leading to the introduction of excessive and unsymmetrical spring rates in the finished gyroscope. Further, the formation of the flexure bars in the above manner results in the latter having a nonuniform thickness across their respective bending axes, leading to further anormalization in the hinge assembly spring rates.

SUMMARY OF THE INVENTION

It is, therefore, an object of the present invention to provide an improved gyroscope flexure hinge assembly which may be manufactured in a simpler manner than the prior art hinge assemblies, yet with greater accuracy of finish.

Towards the fulfillment of this object, the flexure hinge assembly of the present invention comprises a pair of fixed telescoped tubular members, each having at least two pairs of slots extending through the wall thereof, the slots of one pair being axially spaced from the slots of the other pair to form a first gimbal portion and a second gimbal portion adapted for connection relative to a drive member and a driven member, respectively, and a third gimbal portion extending between said first and second gimbal portions, the ends of one slot of each pair of said members terminating a predetermined circumferential distance from the corresponding ends of the other slot of the same pair to form flexure portions between said ends, said flexure portions providing effective connections between said gimbal portions while permitting movement of each of said first and second gimbal portions relative to said third gimbal portion about predetermined coordinate axes.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings:

FIGS. 4 and 5 are developed views depicting the inner hinge unit and the outer hinge unit, respectively.

DESCRIPTION OF THE PREFERRED EMBODIMENTS

Figure 2:
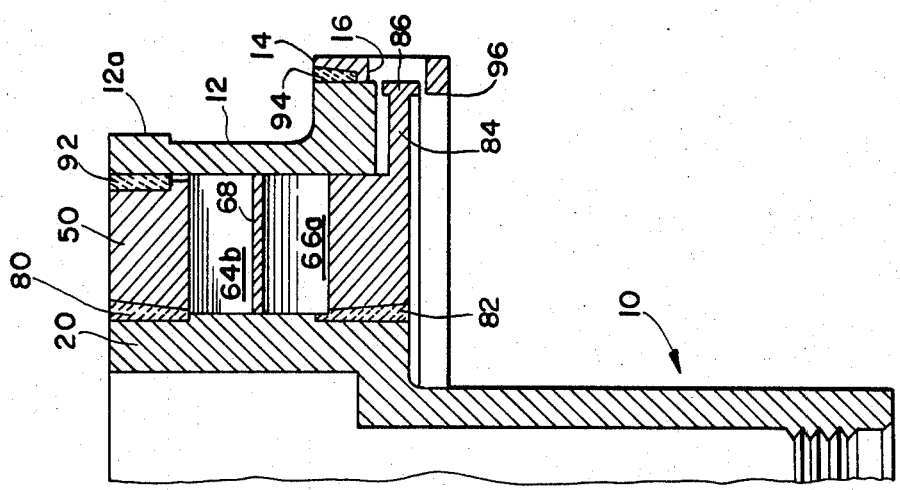
FIG. 2 is a partial vertical cross-sectional view of the flexure hinge assembly of FIG. 1.
Figure 1:
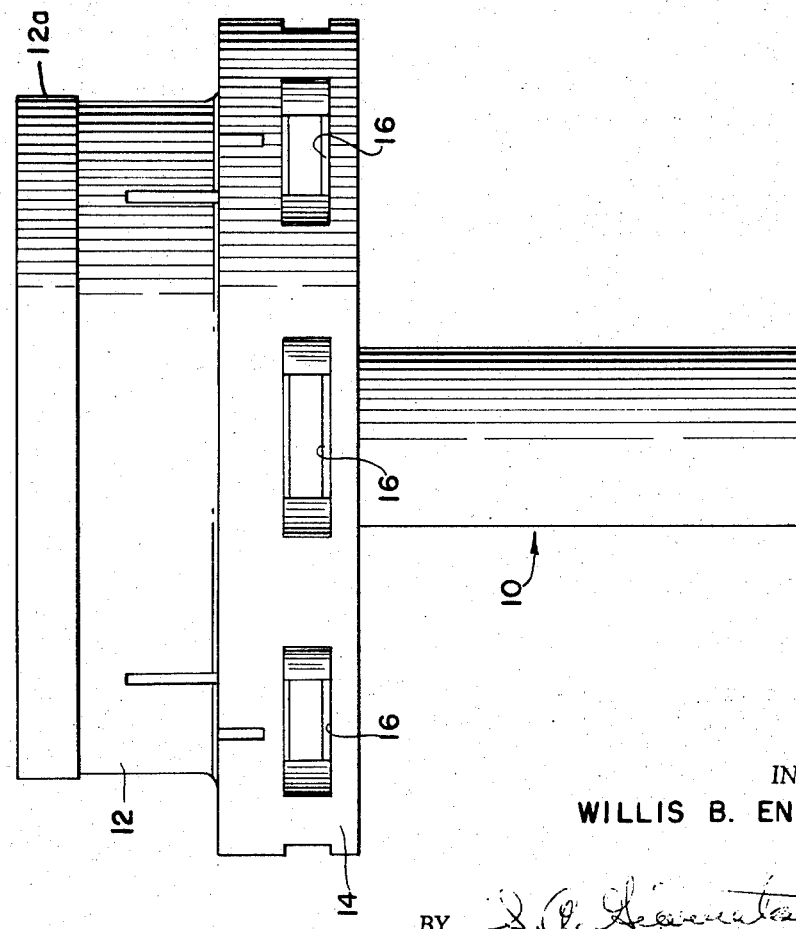
FIG. 1 is a front elevational view of the flexure hinge assembly of the present invention.

Referring specifically to FIGS. 1 and 2 of the drawings, the flexure hinge assembly of the present invention comprises a drive shaft 10 which is adapted to be driven in any known manner. A rotor mounting ring 12 and an angular stop ring 14 are mounted relative to the drive shaft. A plurality of radially extending beveled slots 16 are formed around the circumference of the angular stop ring 14 for reasons that will be explained in detail later.

As viewed in FIG. 2, the upper end of the shaft 10 has a tubular inner hinge unit 20 formed integral therewith. An outer hinge unit 50 extends over the inner hinge unit 20 in a concentric relationship thereto, with the hinge units cooperating to permit universal tilting between the rotor mounting ring 12 and the shaft 10.

Figure 3:
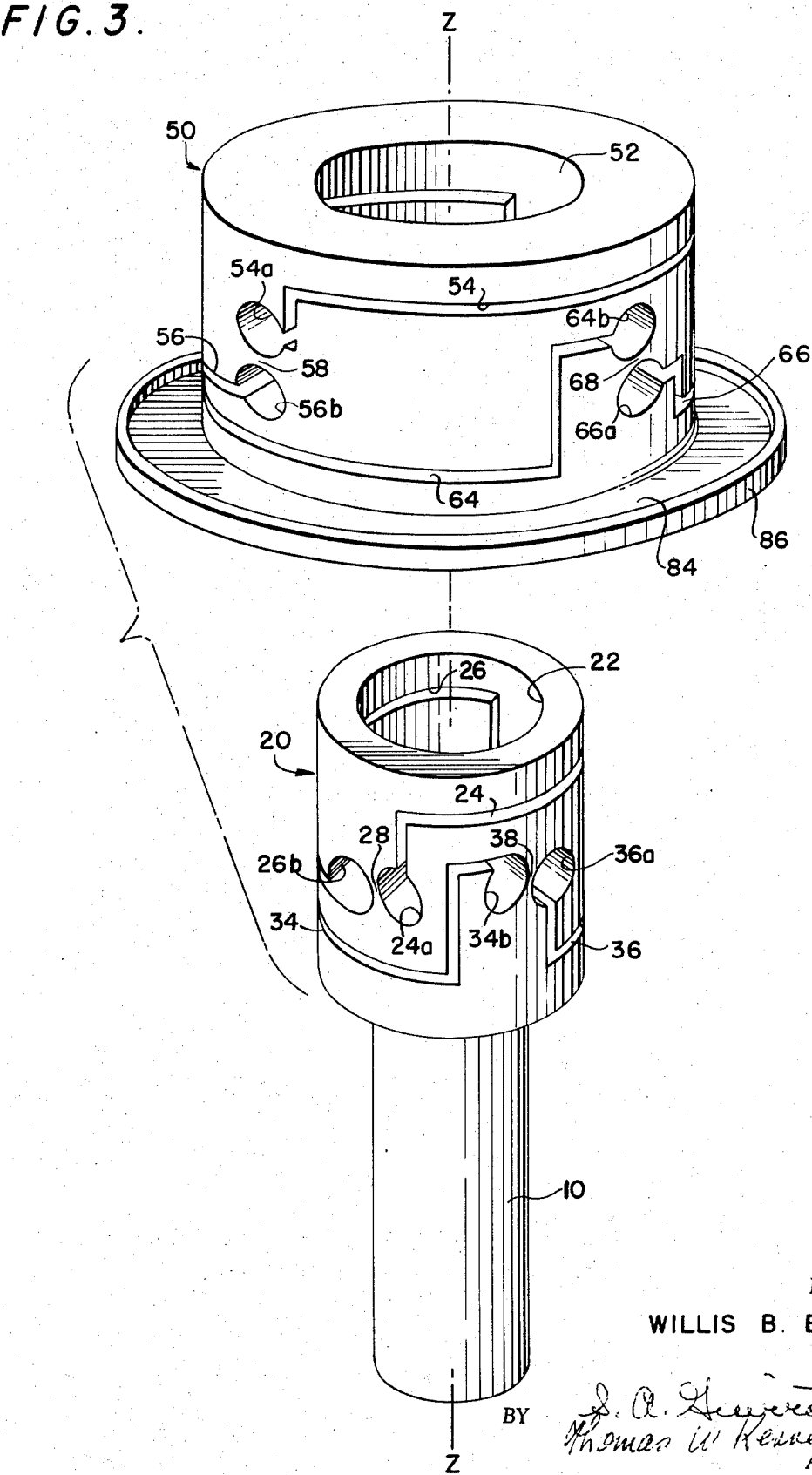
FIG. 3 is an exploded elevational view showing the two hinge units of the present invention.

The inner hinge unit 20 and the outer hinge unit 50 are shown in detail in FIGS. 3–5. Specifically, the inner hinge unit 20 is in the form of a right circular cylinder, or tubular member, having a central bore 22 and a pair of generally circumferentially extending slots 24 and 26. These slots are generally Z-shaped, as better shown in FIG. 4, and an enlarged, radially extending bore, of a diameter exceeding the width of the slots, is formed at the ends of each slot. In particular, bores 24a and 24b are formed at the ends of the slot 24, and bores 26a and 26b are formed at the ends of the slot 26. The bores 24a and 26b are spaced apart slightly to form a necked-down flexure portion 28, and the bores 24b and 26a are spaced slightly apart to form a necked-down flexure portion 30, the flexure portions 28 and 30 extending parallel to the axis Z.

An additional pair of slots 34 and 36 are formed through the inner hinge unit 20 in an axially spaced relation to the slots 24 and 26. The slots 34 and 36 are also generally Z-shaped, are inverted with respect to the slots 24 and 26, and each has a bore formed at its ends. In particular, bores 34a and 34b are formed at the ends of the slot 34, while bores 36a and 36b are formed at the ends of the slot 36. The bores 34b and 36a are spaced slightly apart to form a necked-down flexure portion 38, and the bores 36b and 34a are spaced slightly apart to form a necked-down flexure portion 40. As in the case of the flexure portions 28 and 30, the flexure portions 38 and 40 extend parallel to the axis Z.

It is noted from an inspection of FIG. 4 that the flexure portions 28, 30, 38 and 40 are spaced at 90° intervals around the circumference of the inner hinge unit 20, with the slot 24 overlapping the flexure portion 38, the slot 26 over-lapping the flexure portion 40, the slot 34 overlapping the flexure portion 28, and the slot 36 overlapping the flexure portion 30.

In this manner, three gimbal portions 42, 44, and 46 are formed as a result of the above slots, with the flexure portions 28, 30, 38 and 40 providing an effective connection between the middle gimbal portion 44 and each of the other gimbal portions 42 and 46, while permitting flexing therebetween and providing strength in the axial direction of the hinge unit 20.

The outer hinge unit 50 is shown in FIGS. 3 and 5 and is similar to the inner hinge unit 20 with the exception that the flexure portions formed in connection with the former extend in a direction perpendicular to the axis Z. Particularly, a central bore 52 extends through the unit and a pair of slots 54 and 56 are provided through the wall of the unit, are generally Z-shaped, and have bores 54a, 54b, 56a, and 56, respectively, formed at the ends thereof. The bores 54a and 56b are spaced apart in the axial direction of the unit to define a flexure portion 58, and the bores 54b and 56a are spaced apart in the same direction to define a flexure portion 60.

An additional pair of slots 64 and 66 are formed through the hinge unit 50 and are axially spaced from the slots 54 and 56. The slots 64 and 66 are also generally Z-shaped and are inverted with respect to the slots 54 and 56. Bores 64a and 64b are formed at the ends of the slot 64, and bores 66a and 66b are formed at the ends of the slot 66. The bores 66a and 64b are spaced apart in the axial direction of the unit to define a flexure portion 68, and the bores 64a and 66b are spaced apart in the same direction to define a flexure portion 70. The flexure portions 58, 60, 68 and 70 thus extend in a direction perpendicular to the axis Z.

As in the case of the unit 20, the flexure portions 58, 60, 68, and 70 are spaced apart at 90° intervals, with the slot 54 overlapping the flexure portion 68, the slot 56 overlapping the flexure portion 70, the slot 64 overlapping the flexure portion 58, and the slot 66 overlapping the flexure portion 60.

Three gimbal portions 72, 74, and 76 are formed by the slots 54, 56, 64 and 66, with the flexure portions 58, 60, 68 and 70 providing an effective connection between the middle gimbal portion 74 and each of the gimbal portions 72 and 76, while permitting flexing therebetween and providing strength in a direction perpendicular to the axis of the hinge unit 50.

It is noted that each of the slots 24, 26, 34, 36, 54, 56, 64, and 66 includes a vertical portion 24c, 26c, 34c, 36c, 54c, 56c, 64c, and 66c, respectively. These vertical portions are of a slightly larger width than the remaining portions of the slots and have a particular significance, the details of which will be set forth later.

Although not clearly shown in the drawings it can be appreciated that, with the hinge unit 50 extending over the hinge unit 20 and concentric therewith in the assembled condition of the assembly, the slot 24 can be placed in alignment with the slot 54, the slot 26 in alignment with the slot 56, the slot 34 in alignment with the slot 64, and the slot 36 in alignment with the slot 66. In this position, since the gimbal portion 42 of the unit 20 is coextensive with the gimbal portion 72 of the unit 50, the gimbal portion 44 is coextensive with the gimbal portion 74, and the gimbal portion 46 is coextensive with the gimbal portion 76, three gimbal portions, each of a double thickness, are thus formed.

Referring again to FIG. 2, it is seen that the outer hinge unit 50 is fastened with respect to the inner hinge unit along a pair of circumferential welds shown by the reference numerals 80 and 82. These welds may be made in a conventional manner such as by electron beams, or the like.

The outer hinge unit 50 has a circular ring portion 84 extending outwardly from its lower end, and an axially extending flange 86 projects from the outer circumference of the ring portion.

The rotor mounting ring 12 extends over the outer hinge unit 50 in abutment therewith, with a circumferential weld 92 fastening the units together. The lower end portion of the rotor mounting ring 12 is formed with an outwardly extending circular flange, and the angular stop ring 14 extends around this flange and is affixed thereto by a circumferential weld 94. The lower end of the angular stop ring 14 extends below the lower surface of the outer hinge unit 50 and has an inwardly directed circular flange 96 formed thereon.

The above arrangement is such that the flange 86 of the outer hinge unit 50 is slightly spaced from the bottom end of the rotor mounting ring 12 and from the top surface of the flange 96. In this manner, shims (not shown) may be inserted through the radial slots 16 of the angular stop ring 14 to precisely locate the flange 86 relative to the rotor mounting ring 12 and the flange 96.

Figure 6:
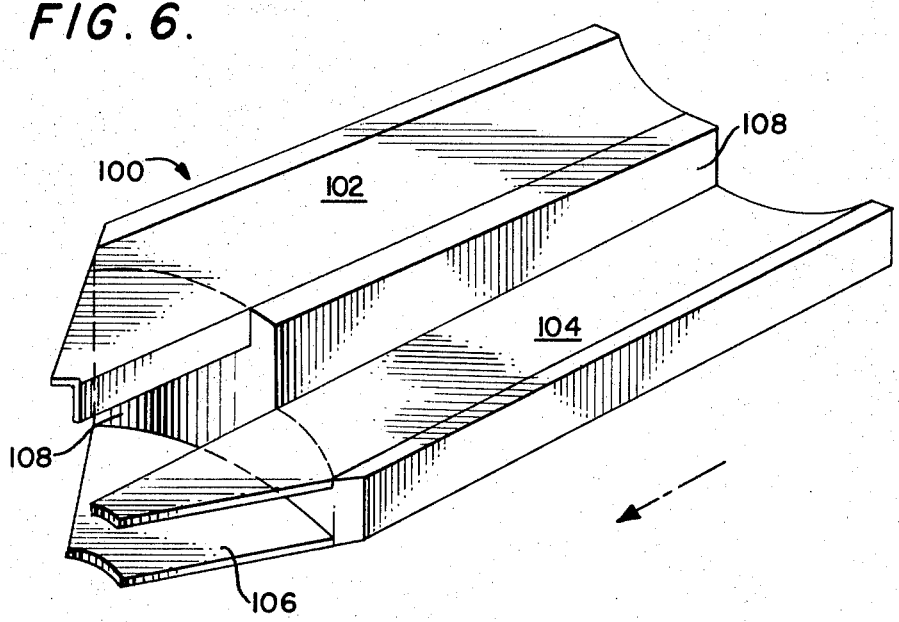
FIGS. 6 and 7 each depicts a cutter unit utilized in the manufacture of the flexure hinge assembly of the present invention.

As shown in FIG. 6, a cutter unit 100 is provided for cutting the various slots in the inner hinge unit 20 and the outer hinge unit 50. The cutter unit 100 comprises three blades 102, 104, and 106 mounted in a mounting block 108. It is understood that external means (not shown) may be utilized to drive the cutter unit 100 in a radial direction towards the assembled hinge units 20 and 50 whereby the blades effect cutting of a portion of the various slots. A comparison of the shape of the blades 102, 104, and 106 in connection with the slot configuration shown in FIGS. 4 and 5 will reveal that the cutter unit 100 will cut a portion of the slots for an angular distance spanning 90°.

In the cutting operation, it is preferred that four cutter units 100 be spaced at 90° intervals and be simultaneously passed through the assembled hinge units 20 and 50, with each cutter unit being passed in the direction shown by the arrow in FIG. 6. If the longitudinal axis of each cutter unit 100 is passed through the mid-point between two adjacent bores in each of the hinge units 20 and 50, a portion of all of the slots in the hinge units, with the exception of the vertical portions 24c, 26c, 34c, 36c, 54c, 56c, 64c, and 66c, will be cut.

Figure 7:
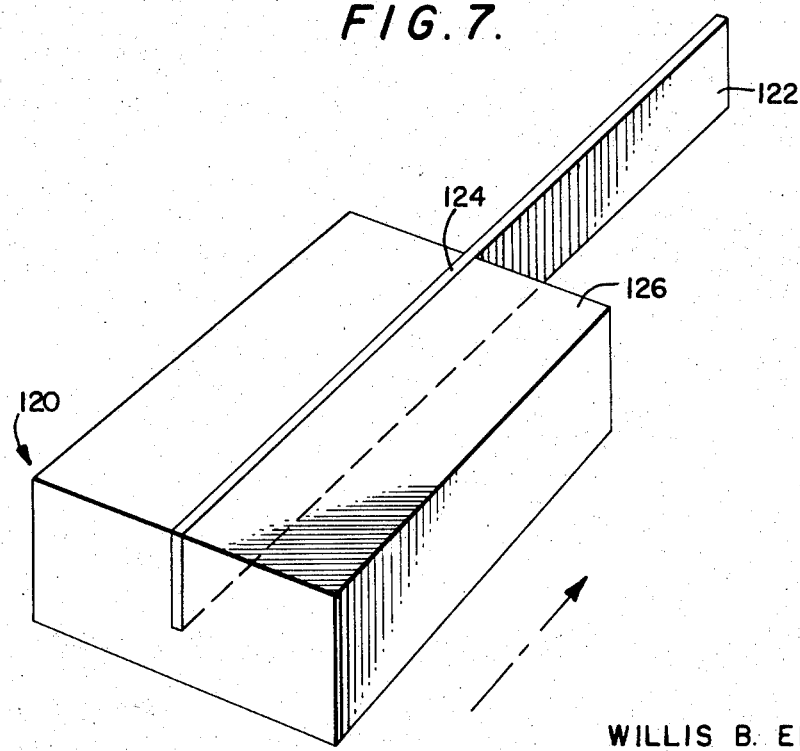

FIG. 7 depicts a cutter unit 120 which is adapted to cut the vertical slot portions 24c, 26c, 34c, 36c, 54c, 56c, 64c, and 66c. The cutter unit comprises an elongated blade 122 mounted in a slot 124 formed in a mounting block 126. As in the case of the cutter unit 100, if four cutter units 120 are spaced at 90° intervals and simultaneously advanced through the assembled hinge units 20 and 50 in the direction indicated by the arrow in FIG. 7, the above-mentioned vertical slot portions will be cut.

It is understood that the blades 102, 104, 106, and 122 may be in the form of electrodes so that the slots may be cut by the electrical discharge machining technique described in detail in application, Ser. No. 838,100 filed July 1, 1969 by the present inventor, and assigned to the assignee of the present invention.

In the assembly of the device of the present invention the various bores (such as 24a, 24b, etc.) are initially machined through the inner hinge unit 20 and the outer hinge unit 50 by a suitable jig grinding mandrel. The outer hinge unit 50 is then placed over, and welded with respect to, the inner hinge unit 20 along the circumferential welds 80 and 82, it being understood that wedges or the like can be utilized to assure precise alignment of the two units before welding.

Four cutter units similar to the cutter unit 100 and spaced at 90° intervals are then passed through the assembled hinge units 20 and 50 as described above to cut all the slots through the hinge units 20 and 50 with the exception of the vertical portions 24c, 26c, 34c, 36c, 54c, 56c, 64c, and 66c.

The rotor mounting ring 12 is then placed over the outer hinge unit 50, and the angular stop ring 14 is placed over the rotor mounting ring. A plurality of shims (not shown) are inserted through the radial slots 16 through the angular stop ring 14, each shim being of a thickness approximately equal to the clearance between the flange 86 and the bottom surface of the rotor mounting ring 12, and between the flange 86 and the top surface of the flange 96. It can be appreciated that this enables precise alignment to be achieved between the shaft 10 and the rotor mounting ring 12.

After the above alignment, the welds 92 and 94 are made to fasten the rotor mounting ring 12 relative to the outer hinge unit 50 and the angular stop ring 14 relative to the rotor mounting ring, and the shims are removed. At this point the design is such that the structure is relatively rigid despite the fact that the above-mentioned slots have been cut. Therefore, the surface 12a, formed on the rotor mounting ring, may be finished ground to a precise degree, and the rotor (not shown) fixed thereto. Then, the vertical portions 24c, 26c, 34c, 36c, 54c, 56c, 64c, and 66c of the slots are cut by means of four cutter units similar to the cutter unit 120, in the manner described above. This frees the various flexure portions and completes the assembly. It is noted that, in making the latter cuts, the cutter units will also pass through the rotor mounting ring 12 and therefore cut a series of vertical slots therethrough.

In operation, rotation of the drive shaft 10 will cause the entire assembly to rotate about the axis Z, thereby transferring angular momentum to the rotor mounted on the ring 12 (not shown). The assembly permits universal tilting of the rotor about any transverse axis normal to the axis Z, while the flexure portions 28, 30, 38, and 40 of the inner hinge unit 20 provide support in tension or compression against all axial loads imposed on the flywheel. In a similar manner, the flexure portions 58, 60, 68, and 70 of the outer hinge unit 50 provide support in tension or compression against radial and/or torsional loads imposed upon the flywheel.

The flange 86, which has been precisely positioned between the lower surface of the rotor mounting ring 12 and the upper surface of the flange 96, serves to limit the above tilting movement between the shaft 10 and the rotor.

It is understood that the other components normally associated with a device of this type, such as a spring rate compensator and a corresponding support ring, may be supported within the inner hinge unit 20.

Of course, other variations of the specific construction and arrangement of the flexure hinge assembly disclosed above can be made by those skilled in the art without departing from the invention as defined in the appended claims.

I claim:

1. A flexure hinge assembly comprising a pair of fixed telescoped tubular members, each said member having a longitudinal axis and a pair of transverse axes arranged in quadrature and intersecting at a common pivot point, said corresponding axes of said members being aligned, said pivot points of said members being substantially coincident, each said member having at least two pairs of slots extending through the wall thereof, the slots of one pair being axially spaced from the slots of the other pair to form a lower gimbal portion and an upper gimbal portion adapted for connection relative to a drive member and a driven member, respectively, and a middle gimbal portion extending between said lower and upper gimbal portions, the ends of one slot of each pair of said members terminating a predetermined circumferential distance from the corresponding ends of the other slot of the same pair to form flexure portions between said ends, said flexure portions providing effective connections between said gimbal portions while permitting movement of each of said upper and middle gimbal portions relative to said lower gimbal portions about said transverse axes, said middle gimbal portions of said members having respective centers of gravity, said centers of gravity being arranged to substantially coincide with each other and with said coincident pivot points, and stop means to limit said movement, wherein each gimbal portion of one of said members is substantially coextensive with a corresponding gimbal portion of the other member, and wherein said stop means includes a ring-shaped stop member having a groove portion receiving said outer lower gimbal, and wherein said inner lower gimbal is fixedly connected to said outer lower gimbal, and wherein said inner upper gimbal is fixedly connected to said outer upper gimbal, and wherein said outer upper gimbal is fixedly connected to said stop member.

2. The assembly of claim 1, wherein a bore is formed through the wall of each of said tubular members at each end of each of said slots, the adjacent bores of each member being spaced a predetermined amount to form said flexure portions, and wherein said stop member comprises a rotor mounting ring fixedly connected to said outer upper gimbal and an angular stop ring fixedly connected to said rotor mounting ring, said angular stop ring having a first ring-shaped flange forming said groove portion, and wherein said outer lower gimbal has a ring portion, said ring portion having a second ring-shaped flange for engaging said first ring-shaped flange.

3. The assembly of claim 1, wherein said ring-shaped stop member has four vertical slots extending through the wall thereof, said vertical slots being radially aligned with corresponding vertical portions of said slots in said inner and outer tubular members.

* * * * *